United States Patent Office 2,883,357
Patented Apr. 21, 1959

2,883,357
ELASTOMER HAVING DISPERSED THEREIN AN ORGANO CLAY

Edgar E. Hardy, Anniston, Ala., assignor to Monsanto Chemical Company, St. Louis, Mo., a corporation of Delaware No Drawing. Application December 29, 1953
Serial No. 401,087

19 Claims. (Cl. 260—37)

This invention relates to the modification of high surface area hydrophilic solids. In one aspect the invention relates to clays having modified surfaces. In other aspects the invention pertains to adducts of certain organic materials with inorganic solids that are gel-forming in water and/or possess ion-exchange-like properties, e.g., clays, silicas, alumina, wherein the organic material is tightly bound to the said solid.

This application is a continuation-in-part of my co-pending application Serial No. 374,423, filed August 14, 1953, now abandoned.

An object of this invention is to provide modified inorganic solids. Another object of the invention is to provide high surface area silicates of divalent and trivalent metals modified by chemical reaction with certain organic materials. A further object is to provide silicates, metal oxides, hydroxides, etc., having high surface areas and normally hydrophilic in nature, modified by adducting with certain organic materials wherein the latter is tightly bound to the clay and not readily removable by washing with organic solvents. Yet another object of the invention is to provide a method for combining comparatively large quantities of organic material with clay minerals. A further object is to provide organo-clay adducts useful in admixture with rubbers. Still another object is to decrease the hydrophilic nature of montmorillonite. Another object of the invention is to provide hydrophobic ion-exchange type solids. A still further object of the invention is to provide rubber compositions. Further objects and advantages of the invention will be apparent to those skilled in the art from the accompanying disclosure and discussion.

In accordance with the present invention one or more of the foregoing objects are accomplished by reaction of high surface area hydrophilic solid substances possessing ion-exchange-like properties, for example silicas, clays, metal oxides, with a compound selected from the group consisting of mono-N-substituted carbamyl halides, mono-N-substituted thiocarbamyl halides, bis(mono-N-substituted) ureas, and bis(mono-N-substituted) thioureas. In preferred embodiments the invention employs natural clay minerals having a high surface area, generally of the expanding lattice type having high ion exchange capacity. Montmorillonitic clays, e.g., bentonites, are preferred materials. The invention is also applied with advantage to other silicates of divalent and trivalent metals, silicas, aluminas, and various other high surface area hydrophilic solids, especially those generally used as rubber fillers. The invention is broadly applicable to organic mono-N-substituted carbamyl halides and thiocarbamyl halides, and organic bis(mono-N-substituted) ureas and thioureas. Bis(mono-N-substituted) ureas are sometimes referred to as disubstituted ureas. The compounds in question can be indicated by the following formulae, wherein R is an organic radical and X is halogen:

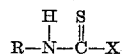

Mono-N-substituted carbamyl halides

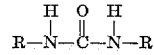

Mono-N-substituted thiocarbamyl halides

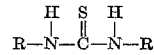

Bis(mono-N-substituted) ureas $$\begin{array}{c} H \;\; S \;\; H \\ | \;\; \| \;\; | \\ R-N-C-N-R \end{array}$$

Bis(mono-N-substituted) thioureas

Included within the scope of the invention are compounds containing two or more of the radicals

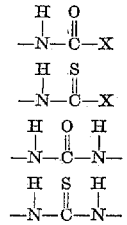

Where mention is made hereinafter of substituted carbamyl halides, substituted thiocarbamyl halides, substituted ureas, and substituted thioureas, it will be understood that the mono-N-substituted compounds as described above are meant.

In the following discussion and description of the invention, the substituted carbamyl halides and substituted ureas will be referred to as a matter of convenience and because they are preferred in most instances. It is to be understood that wherever reference is made to substituted carbamyl halides or substituted ureas in general or to specific substituted carbamyl halides or substituted ureas, it is to be taken as exemplary both of the substituted carbamyl halides and substituted ureas and the corresponding substituted thiocarbamyl halides and substituted thioureas, and the said thio-compounds can be used instead of the mentioned substituted carbamyl halides or substituted ureas if desired.

The invention broadly applies to all methods of interacting the organic compounds of the type described with solids of the nature described, and the products obtained thereby. In one preferred practice of the invention the clay or other solid, after drying (but not calcining), is suspended in a suitable organic solvent containing the desired substituted carbamyl halide or substituted urea (or substituted thiocarbamyl halide or substituted thiourea), the reaction mixture is heated, preferably under reflux, for a period of a few hours, and the resulting adduct is recovered by filtration or centrifuging. In another preferred practice of the invention, the clay or other solid is admixed with a suitable quantity of the desired substituted carbamyl halide or substituted urea and maintained in a closed container at an elevated temperature, preferably with agitation, the conditions and time of heating being such as to cause a migration of vapors of the organic compound throughout the body of the clay with accompanying reaction of same with clay to form an adduct.

The invention provides a simple and effective method of modifying the properties of the surfaces of clays and other high surface area inorganic solids, and permits the production of clays and the like containing a high percentage of tightly bound organic material. The reaction is easily carried out without the necessity of added catalysts, although in the case of thiocarbamyl halides and thioureas in particular a small amount of a catalyst, for example of the acid-base type such as a pyridine-acetic acid mixture, can sometimes be present to advantage. The products in many instances still retain reactivity, particularly where polyfunctional compounds, i.e., those containing more than one of the carbamyl halide or urea type radicals set forth above and those containing one such radical plus one or more other functional groups, are used, and such reactivity allows further modification by suitable chemical and/or physical treatment. The products of this invention are less hydrophilic than the starting clay or other hydrophilic inorganic solid, and therefore useful in many ways. One feature of the present invention is the employment of these adducts as fillers, extenders, and/or reinforcing agents in natural and synthetic rubbers. It will be apparent that with the numerous types of high surface area solids and the numerous organic compounds of the type described herein, both mono- and polyfunctional, available, and the various methods of preparation, as well as the varying proportions of the reacting materials involved, a variety of products can be obtained. Such products will of course have differing characteristics in accordance with the foregoing factors, so that some will be preferred for one use while others are preferred for different uses. Thus, all products coming within the broad scope of this invention cannot be considered to be the full equivalents of each other for all purposes.

In the following description of procedures and conditions for making adducts of this invention, particular reference will be made to clays, which are preferred inorganic solids to be adducted. In the discussion, clays are to be taken as one example of the various high surface area hydrophilic inorganic solids with which the invention is concerned, and a fuller description of such solids is given hereinafter.

The adduct-forming reaction should preferably be effected in an essentially anhydrous system, and this is particularly true with the substituted carbamyl halides. It is preferred to dry thoroughly all starting materials. Of course, care must be taken in drying the clay to avoid temperatures and times of drying that will cause degradation including loss of surface area. Those skilled in the art are well aware of or can easily determine suitable conditions for drying any particular clay that will drive off the bulk of the water present without injuring the clay. For example, most clays can be heated for limited periods of time, up to say 500° C. However, there are indications that even much lower temperatures, as low as 125° C. to 150° C. can be disadvantageous if applied for several hours. Thus, with any given clay, organic compound of the type described herein, and reaction system, an optimum temperature will be found that gives comparatively complete and rapid reaction without unduly affecting the properties of the finished product. Generally, in deliberately drying a clay, reduction of water content to a value of 1 weight percent is satisfactory. It is often possible to make satisfactory products directly from clays, silicas, and other inorganic solids of the type described herein in their usual commercial state without a special drying step.

A preferred procedure is to suspend the finely divided clay in the organic solvent to be used and reflux the system for a few hours, with a water trap in the condensate return line. This results in a thorough drying of the solvent and removes undesirable excess water from the clay. After this drying procedure the substituted carbamyl halide or substituted urea is added and the total reaction mixture refluxed for a period which will depend upon the temperature, clay and added organic compound involved, but will generally be in the range of from 1 to 10 hours. A substituted thiocarbamyl halide or thiourea will often require a longer reaction time and/or higher temperature than its corresponding carbamyl halide or urea analogue. Temperatures of 50° C. and up are suitable for the reaction. Higher temperatures provide a shorter reaction time but it is preferred not to exceed 150° C. in order to avoid decomposition of clay and/or product. Thus, the temperature of boiling benzene, toluene, or xylene, operating at atmospheric pressure, is satisfactory, with toluene in some instances being the best. With the lower boiling solvents, pressure can be imposed on the system to increase the reaction temperature if desired. While refluxing is not necessary, it is advantageous in providing efficient agitation at all times.

Hydrocarbon solvents are preferred. Included are the aromatic, alicyclic and a aliphatic hydrocarbons, for example benzene, toluene, xylene, cumene, cyclohexylbenzene, cyclohexane, dimethylpentane, octane, dodecane, naphthas boiling between 50° C. and 150° C., and the like. Olefinic and cycloolefinic hydrocarbons can be used but are less preferred because of their cost and higher reactivity. Hydrocarbons substituted with non-hydrocarbon radicals that do not interfere are also permissible. In this connection it is desired to avoid alcohols, carboxylic acids, esters, amines, etc., that may undergo reaction with the substituted carbamyl halide or substituted urea. Likewise, it is desired to avoid amines and other compounds that undergo reaction with clay. Ethers, and nitro- and halogen-substituted hydrocarbons, are suitable. The following are examples: n-propyl ether, isopropyl ether, methylhexyl ether, dibromobutane, ethylene dichloride, carbon tetrachloride, nitrobenzene, nitrobutane. Choice of a suitable quantity of solvent is principally dependent upon ease of manipulation. From 1 to 5 parts by weight of solvent per weight of clay is usually sufficient.

For some uses the adduct obtained by simple separation from the solvent and any unreacted organic compound dissolved therein, e.g., by filtration or centrifuging, with or without additional washing with organic solvent, will be suitable. In other cases it is preferred after separation of solid from liquid to wash the adduct with water, which serves to remove liberated or loosely bound inorganic ions, e.g., sodium or calcium, and also to destroy any unreacted substituted carbamyl halide present. When substituted carbamyl halide (or thiocarbamyl halide) is the reactant used, a marked lowering of the halogen content of the solid adduct occurs on water washing. After such water washing, a washing with an alcohol, such as methanol or ethanol, or with a hydrocarbon, such as benzene or hexane, followed by washing with a lower dialkyl ether, e.g., ethyl ether, is desirable. In many instances the water step can be eliminated. The thuswashed adduct is then dried at moderate temperature conditions, for example at temperatures below 100° C. and conveniently under less than atmospheric pressure.

Instead of refluxing in an organic solvent, another preferred procedure involves merely heating the clay and organic reactant together in a closed system. This procedure is termed herein the "vapor phase" method, inasmuch as an appreciable vapor pressure of the organic reactant is present in the reaction mixture. By this procedure, the finely divided clay or other inorganic solid, and the chosen amount of substituted carbamyl halide or substituted urea, are placed in a pressure vessel, preferably adapted to agitate the clay as by tumbling, stirring, or the like. The adduct can be prepared at temperatures apparently considerably higher than those easily tolerated by the refluxing procedure. Such temperatures can be, for example 100° C. to 300° C. A suitable reaction time will be usually found within the range of 1 to 5 hours. As described above with respect to adduct prepared in an organic solvent, adduct prepared by the "vapor phase" method can be washed with water and/or organic solvent when desired.

Still other methods of reacting substituted carbamyl halides or substituted ureas with clays and other inorganic solids of the type described herein will be apparent. Thus, a finely divided clay can be "fluidized" by passage of a gas upwardly through a body of clay at flow rates adapted to maintain a fluidized bed having a well-defined upper surface, the organic reactant being carried into the fluidized bed by the fluidizing gas.

While the invention is broadly applicable to the reaction by any procedure, of any quantity of organic substituted carbamyl halide or substituted urea with clays or other solids of the nature described herein, I generally prefer to employ at least a stoichiometric quantity of the substituted carbamyl halide or substituted urea, and preferably a slight excess. The stoichiometric quantity is calculated on the basis of the base exchange capacity of the clay. Thus, bentonite having a base exchange capacity of 80 milliequivalents per 100 grams, is reacted with 80 milliequivalents of a substituted carbamyl halide, or with 40 milliequivalents of a substituted urea, if the stoichiometric quantity is to be used. From one to two times the stoichiometric quantity of organic reactant is usually employed. The actual quantity that becomes associated with the clay is dependent upon a number of factors, and the association is not believed to be caused by a base exchange type of reaction. The reaction mechanism is not known. An initial substituted urea reactant may be adsorbed by or may react with the clay. Use of the substituted carbamyl halides may involve the formation of the corresponding isocyanate by loss of hydrogen halide, possibly followed by formation of a disubstituted urea by reaction of isocyanate with adsorbed water or with clay, which disubstituted urea is then adsorbed by the clay, or perhaps a urethane type of reaction of isocyanate with hydroxyl groups of the clay; or the substituted carbamyl halide may react directly with the clay. It is to be emphasized, however, that the invention is not to be limited by any particular theories presently advanced. It has been observed that those clays having a higher base exchange capacity in general seem to react with larger quantities of the organic reactant. In many instances a close correlation has been found between quantity of organic material bound to the clay and the base exchange capacity of the clay, while in other instances there is considerable difference between these values. However, it is convenient to discuss the matter in terms of stoichiometric quantity as defined above. Many of the high surface area hydrophilic inorganic solids, other than clays, that can be used in the practice of this invention, are known to contain hydroxyl groups at the surface. It is presumed that the adducts are formed with such solids in a manner somewhat similar to the formation of adducts with clays. The same explanation may not be so readily applicable to certain other hydrophilic high surface area solids of the nature described herein. It is possible that the adduct formation with some solids, or even all solids including clays, is by physical adsorption, although present indications point to some type of chemical reaction as probably occurring in most instances. For the purpose of the present invention, an explanation based on simple physical adsorption is acceptable. The term "adduct" is to be construed broadly as meaning a combination of organic compounds of the type described herein with solids of the nature described herein regardless of the mechanism involved, and regardless of whether or not chemical changes occur in the organic compound or the solid or both. While as little as 1 weight percent organic compound, based on the inorganic solid, will in some instances be useful, most preparations are made with from 5 to 50 weight percent substituted carbamyl halide or substituted urea. Up to 100 weight percent and more is sometimes advantageous.

As has been stated hereinbefore and as will be apparent from the foregoing discussion of the preparation of the adducts, the organic material becomes firmly bound to the clay. Washing with organic solvents, for example benzene, gives a product which still contains a high percentage of organic material. However, intermittent or continuous extraction with fresh hot solvent over a long period of time, as for example by extraction with benzene in a Soxhlet apparatus for say 24 hours, is apparently sufficiently drastic to remove most of the organic material from some adducts. The products are generally less hydrophilic than the starting clay, and products can be made that are just sufficiently organophilic to be distributed at the interface between water and an organic solvent or can be made more organophilic so that they are preferentially wetted by organic solvents.

The invention is broadly applicable to all organic substituted carbamyl halides and to all organic bis(mono-N-substituted) ureas although those skilled in the art will appreciate that not all such compounds are the full equivalents of each other for purposes of the invention. The mono-functional compounds are usually preferred, i.e., those organic compounds containing a single carbamyl halide (—NHCOX) or single area (—NHCONH—)

group. For certain purposes difunctional compounds, i.e., organic compounds containing two such groups, are valuable. Organic compounds containing three or more such groups are also within the scope of the invention. The portion of the molecule other than the carbamyl halide or urea group or groups designated R in the structural formulae given hereinbefore can be aliphatic, alicyclic, aryl, or heterocyclic, or can contain combinations of such groups. While there is no particular limit on molecular weight of the compounds, those substituted carbamyl halides containing not more than about 30 carbon atoms per molecule, and those substituted ureas containing not more than about 60 carbon atoms per molecule, are generally most useful. The most common type of aliphatic compounds used are the mono-N-alkyl carbamyl halides and the bis(mono-N-alkyl) ureas, either with unsubstituted alkyl group or those wherein the alkyl group or groups are substituted with non-interfering radicals, such as Cl, $NO_2$, or Br, as in the 3-chloro-, or 3-nitro-, or 3-bromopropyl compounds. Such radicals can in many instances be valuable in that the final product is reactive, by virtue of said radicals, with various chemical reagents, thus providing materials having a wide variety of uses. Alkenyl carbamyl halides and ureas can also be employed, and the alkenyl groups can similarly have non-interfering non-hydrocarbon substituents. Among the alicyclic compounds, the cycloparaffinic and cycloolefinic, either unsubstituted or substituted similarly to the alkyl and alkenyl as described above, are preferred. The alkyl or alkenyl groups can be straight chain or of the various branched chain configurations. Aryl compounds include those wherein the carbamyl halide or urea group or groups are attached to an aryl nucleus, e.g., benzene, naphthalene, etc. The alkaryl and aralkyl compounds can be considered as coming within either type of grouping, and among these may be mentioned N-benzyl carbamyl chloride which is an aralkyl carbamyl halide, and meta-tolylene dicarbamyl chloride (2,4-dicarbamyl chloride toluene) which is an alkaryl carbamyl chloride.

Of course, these are also carbamyl halides containing carbamyl halide groups on both aryl and alkyl substituents in the same molecule. One or more carbamyl halide or urea groups can be attached to non-interfering heterocyclic nuclei, e.g., furane, etc., said nuclei being unsubstituted or substituted with hydrocarbon or non-interfering non-hydrocarbon radicals as aforesaid; carbamyl halide or urea groups can likewise be attached to aliphatic, alicyclic or aryl groups attached to heterocyclic nuclei. While the carbamyl chlorides are preferred, the corresponding bromides, iodides and fluorides can also be used. With respect to the substituted ureas, it may be mentioned that in most instances, the substituent on one N atom will be identical with that on the other N atom due to simplicity in synthesis; that is, both R's will be the same in the formula

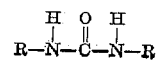

However, it is to be understood that the bis (mono-N-substituted) ureas are inclusive of compounds that contain different R's in the same molecule. By way of example and not limitation, the following carbamyl halides and substituted ureas can be named as suitable for use in practicing the invention:

Ethyl carbamyl chloride and thiocarbamyl chloride
t-Butyl carbamyl bromide and thiocarbamyl bromide
Cyclohexyl carbamyl chloride and thiocarbamyl chloride
Allyl carbamyl chloride and thiocarbamyl chloride
Octadecyl carbamyl chloride and thiocarbamyl chloride
m-Phenylene dicarbamyl chloride and dithiocarbamyl chloride
4,4'-biphenyl dicarbamyl chloride and dithiocarbamyl chloride
Naphthyl carbamyl chloride and thiocarbamyl chloride
α-Furane carbamyl chloride and thiocarbamyl chloride
Butenyl carbamyl chloride and thiocarbamyl chloride
p-Chlorophenyl carbamyl chloride and thiocarbamyl chloride
m-Nitrophenyl carbamyl chloride and thiocarbamyl chloride and diethyl-, dibutyl-, dicyclohexyl-, dibenzyl-, di-p-chlorophenyl-, dioctadecyl-, and di-α-thienyl ureas and thioureas.

The invention is likewise applicable to all organic mono-N-substituted thiocarbamyl halides and to all organic bis-(mono-N-substituted) thioureas, although here again those skilled in the art will appreciate that not all of these thio compounds are the full equivalents of each other or of the various substituted carbamyl halides and substituted ureas for purposes of the invention. For the sake of brevity and to avoid repetition, it will suffice to point out that all of the statements made in the preceding paragraph with respect to substituted carbamyl halides and substituted ureas are also applicable to the substituted thiocarbamyl halides and substituted thioureas, and the thio analogues of all of the classes of carbamyl halides and ureas and specific carbamyl halides and ureas named therein are also useful in the practice of the present invention.

Ordinarily a single substituted carbamyl hlide or thiocarbamyl halide or substituted urea or thiourea is used. However, a mixture of two or more can be used if desired, for example a mixture of N-octadecyl carbamyl chloride with 2-butene-1,4-di(carbamyl chloride) in any proportions, or a mixture of N-octadecyl carbamyl bromide with N,N'-dicyclohexyl thiourea in any proportions, etc., can be reacted with any solid of the nature described herein. Furthermore, a single molecular species containing two or more different radicals selected from the carbamyl halide, thiocarbamyl halide, urea and thiourea radicals described above, although not ordinarily synthesized with convenience and thus not readily available, is not outside the scope of the invention; such a compound is of course both a carbamyl halide and a urea, or both a thiocarbamyl halide and a urea, etc., as the case may be.

Organic compounds as described above can be reacted, in the practice of this invention, with clays or other ion-exchange type solids. The invention is broadly applied to high surface area hydrophilic inorganic solids. The organic compounds in question can be reacted with materials of the nature of hydrophilic substances that have ion-exchange capacity either in the sense of ion-exchange clays or which act in that manner, many of which are also gel-forming in water. An inorganic solid that is gel-forming in water and/or possesses ion-exchange like properties can be used. Generally speaking, a solid that undergoes an ion-exchange type of reaction is used, commonly referred to as ion-exchange adsorbent materials. Among the materials that can be used are hydrophilic inorganic materials having high surface area, preferably at least 10 square meters per gram, and capable of ion-exchange reaction or a phenomenon which resembles ion-exchange reaction. Preferred materials are artificial and natural silicates of aluminum, magnesium, iron, calcium and other divalent and trivalent metals, that have high surface area and good adsorptive properties. Those capable of taking up the largest quantity of organic compound of the type described herein are usually clays of the expanding lattice type having substantial base exchange capacity, preferably at least 20 milliequivalents and often up to 100 or more milliequivalents per 100 grams of clay. The montmorillonite clays are preferred and the most common of these is bentonite. For example a Wyoming bentonite, which is a sodium bentonite, is quite effective. Calcium bentonites, and acid clays either naturally occurring or made by treating sodium or calcium bentonites with aqueous acid, can also be used. Ilmenite, kaolinite, hectorite, magnesium-substituted montmorillonites in general, beidellite, attapulgite, nontronite, saponite, are other examples of suitable clays. Asbestos, a naturally occurring magnesium calcium silicate is useful, as are related fibrous crystalline anhydrous silicates. Other silicates, e. g., mica, suitable glasses especially in fiber form, can be employed. The invention is particularly applicable to adducts, prepared from high surface area silicates, among which can be mentioned especially silica xerogels and aerogels and diatomaceous earth. Other desirable materials to be adducted in accordance with the invention include metal oxides (including hydroxides), and metal carbonates, special reference being made to alumina, aluminum hydroxide, iron hydroxide, calcium carbonate, molybdenum oxide and zinc oxide. Suitable hydrophilic inorganic materials forming a gel in water include oxides (including hydroxides), of alkaline earth metals and other polyvalent, especially di- and trivalent metals, such as aluminum, iron, vanadium, and certain phosphates, sulfides and sulfates of heavy metals, e.g., molybdenum sulfide, in gel form.

When a naturally occurring clay is to be used, it is preferred but not required that it be from a deposit which is essentially pure clay, or that it be subjected to known purification treatments to free it from non-clay material and produce an essentially pure clay, e. g., a material which is at least 95 weight percent clay. A conventional treatment involves suspension of impure mined clay in water, settling of non-clay impurities (sand, silt, etc.), and separation of the settled impurities from the clay suspension. The latter is then dried and if necessary ground to give a finely divided clay.

Regardless of the hydrophilic inorganic solid employed or the preparation method used, the adducts of the present invention are best used in the form of fine particles, preferably not larger than 100 mesh, i.e., not more than 1 percent retained on a No. 100 U.S. Standard Sieve. A final drying step in the preparation may be desirable. The finished isolated product is a non-aggregated finely divided pulverulent reaction product or adduct. In some instances it may be possible to use the adduct in other than finely divided form where the subsequent manufacturing step or steps, e.g., blending the adduct with rubber on a mill, results in breaking up of adduct particles so that the adduct is ultimately in finely divided form. However, it is usually true that the more intimate the dispersion of adduct with other materials the more beneficial the results that are obtained by use of the adduct. Thus, even ball-milling an adduct for a considerable period of time to produce extremely fine particle size and then incorporating such adduct with rubber on a mill does not usually give nearly so satisfactory a result as does admixing finely divided adduct with rubber latex and then coprecipitating the materials by coagulating the latex containing the finely divided adduct dispersed therein.

The words "hydrophilic" and "hydrophobic" are used herein to refer to the wettability and non-wettability of a substance by water. Considering for example kaolinite, it may be thought of in one sense as hydrophobic, since water does not penetrate throughout the molecule to form a solution, as water with gelatin for instance. However, kaolinite is easily wet by water and tends to swell at least to a slight extent in water, so it is considered to be hydrophilic as the term is used herein. Most of the hydrophilic solids with which the present invention is concerned will, when scattered in finely divided form on the surface of a body of water, immediately sink down into and through the water. In many cases the adducts prepared in accordance with the present invention from such solids will also exhibit the same property of passing down through the water when dropped on top, however, such adducts are still considered to be hydrophobic in that they are more resistant to wetting by water than the parent solid. Often such hydrophobic nature can be demonstrated by the ability to be distributed at the interface between water and an organic solvent, or even to be preferentially wetted by an organic solvent as compared with water. It is also possible in accordance with the invention to make such solids sufficiently hydrophobic that they will float indefinitely when scattered in finely divided form on the surface of a body of water. The extent of the hydrophobic character of course will be dependent not only on the method of preparation but also on the starting materials and the percentage of organic matter in the adduct. In preparing adducts in the practice of the present invention hydrophilic substances are made (by reaction with organic compounds of the type described herein) hydrophobic, manifested by an increased resistance towards wetting by water.

Use of the adducts described herein as fillers or reinforcing agents for elastomers (rubbers) constitutes an important feature of the present invention. As used herein, the term "rubber" includes both natural rubber and synthetic rubbers. Particularly valuable synthetic rubbers are those prepared by polymerization of a monomeric material comprising a conjugated diolefin, e.g., butadiene, isoprene, chloroprene, etc. However, other synthetic rubbers, including silicone rubbers, are also used. Of particular interest for admixture with silicone rubbers are the high surface area silicas treated to form adducts in accordance with procedures described herein. Another type of synthetic rubber that can be admixed with adducts of the nature described herein comprises those known as polyester-urethane elastomers. These materials are made by the condensation polymerization of a low molecular weight linear polyester with diisocyanates. The elastomer preparation involves: (1) preparation of linear polyester from a glycol and a dibasic acid; (2) chain extension of the polyester with diisocyanate giving a storable elastomer; and (3) cross-linking of the elastomer by further reaction with diisocyanate. See Chemical and Engineering News, 31, 2390 (1953), for additional details. Copolymers of a major portion of butadiene with a minor portion of styrene, acrylonitrile, or other copolymerizable monomer now make up the great bulk of the synthetic rubber manufactured. Methods of making same and their properties are well known to the art.

Natural and synthetic rubbers for most uses require reinforcement. Probably the commonest material used for this purpose is carbon black. However, this obviously gives a black rubber and where a white or light tinted rubber composition is required, there is great need for reinforcing agents other than carbon black. Also for many purposes considerable amounts of fillers can be used without adversely affecting the physical properties. Adducts of the present invention made from clays, silicas, alumina and other solids, especially those solids ordinarily used as rubber fillers, are useful as fillers, extenders, and/or reinforcing agents in rubbers. The adducts are incorporated with the rubber composition and other components of the final rubber mix on rubber mills, in Banbury mixers, or by other techniques common in the industry, but preferably by admixture with a latex followed by coprecipitation of the total solids content of the resulting mixture. Ordinarily the final rubber mix is vulcanized in known manner. The quantity of adduct used will, of course, depend upon its properties in the rubber mix and the particular rubber, adduct and other ingredients to be used. The quantity of adduct may range from 1 part up to 50 parts and more by weight per 100 parts rubber.

The following examples provide detailed information on some preferred embodiments of the invention, without attempting to illustrate all combinations of reactants and procedures coming within the scope of the invention.

*Example 1*

N-octadecyl carbamyl chloride was reacted with a "Filtrol" clay.

As received the clay contained 17 percent moisture. This clay, before treatment with N-octadecyl carbamyl chloride, had the following analysis on a dry basis:

| | |
|---|---|
| c-Axis spacing, A | 13.6 |
| Carbon _____percent__ | 0.12 |
| Hydrogen _____do____ | 1.22 |
| Ignition residue _____do____ | 95.90 |
| Nitrogen _____do____ | 0.20 |
| pH | 3.3 |
| Calcium (leachable) _____percent__ | 1.47 |

Based on calcium percent this clay before reaction with the carbamyl chloride had an exchange capacity of 74.6 milliequivalents per 100 grams clay.

One-hundred grams of the clay was stirred and refluxed with 500 ml. toluence to azeotrope off all water. Then, to the resulting dry slurry of clay and toluene, was added 0.17 mole of N-octadecyl carbamyl chloride dissolved in 100 ml. toluene. The resulting mixture was maintained at 80° C. for 8 hours, with constant stirring, during which time some evolution of hydrogen chloride gas occurred. The mixture was cooled, filtered, and the solids slurry-washed twice with toluene in a Waring Blendor. This was followed by three washings on the filter with toluene. The solids were then dried in a vacuum oven for about 20 hours at 68° C. A sample of the thus dried adduct was analyzed for carbon, hydrogen, residue or ignition, nitrogen, and chlorine, with results as given in the table below.

Another sample of the dried adduct was washed in a Waring Blendor with distilled water and filtered. The solids were dried in the vacuum oven at 74° C. for 72 hours at the vacuum produced by a water aspirator pump. The thus washed and dried material was then analyzed in the same manner as the material that had not been washed with water, with results as indicated in the following table.

| | Adduct | Water-Washed Adduct |
|---|---|---|
| Carbon, weight percent | 19.5 | 19.42 |
| Hydrogen, weight percent | 4.63 | 4.57 |
| Ignition residue, weight percent | 71.22 | 70.17 |
| Nitrogen, weight percent | 1.28 | 1.35 |
| Chlorine, weight percent | 2.49 | 0.48 |
| Milliequivalents octadecyl carbamyl chloride per 100 g. clay: | | |
| N basis | 130 | |
| C basis | 117 | |
| Cl basis | 91 | |

From the foregoing data it will be seen that the N-octadecyl carbamyl chloride reacted readily with the clay to give an adduct containing a high percentage of organic material. Furthermore, on washing with water the adduct did not lose its organic material, as the carbon content and nitrogen content both increased slightly. The very marked decrease in chlorine content in the water-washed sample as compared with the unwashed sample, the drop in ignition residue, and the increase in carbon and nitrogen, all occurring on washing the adduct with water, are strongly indicative that the water washing removed an inorganic chloride from the adduct, presumably calcium chloride.

The initial adduct, i.e., the adduct that was not washed with water, when sprinkled (in finely divided form) on the top of a body of water in a beaker, floats indefinitely, in contrast to the untreated clay which when similarly scattered (in finely divided form) on the top of a body of water immediately sinks down through the water. The adduct that was washed with water and then dried, when similarly sprinkled (in finely divided form) on the top of a body of water in a beaker, showed no difference in water repellency from the unwashed adduct, i.e., it too floated indefinitely on the surface of the water.

*Example 2*

To a 500 ml. round-bottomed flask was added 10 g. of undried "Filtrol" clay described in Example 1 and 250 ml. of benzene containing 2.7 g. of N,N'-dioctadecyl urea. The flask was equipped with a Dean-Stark trap and a reflux condenser so that as soon as refluxing of the benzene started, the water azeotroped out of the reaction mixture was removed by the trap.

The mixture was refluxed for 4 hours at atmospheric pressure, after which the resulting product was filtered off from the hot benzene. The adduct was then washed six times with hot benzene, in each instance a centrifuge being used to remove excess solvent. The material was then given a final wash with ether, after which it was dried and subjected to analysis with the following results:

| | Weight percent |
|---|---|
| Carbon | 5.72 |
| Hydrogen | 2.45 |
| Nitrogen | 0.33 |

It thus appears that, after thorough washing with hot benzene and ether, the clay retained in the neighborhood of one-half of the N,N'-dioctadecyl urea charged.

The hydrophobic properties of this adduct were determined as follows, in comparison with the untreated clay. Two beakers of equal size were filled with water and placed side by side. On the top surface of the water in one of the beakers a quantity of the untreated clay (in finely divided condition) was dumped. On the top surface of the water in the other beaker was dropped a like quantity of the adduct (in finely divided condition). Both the clay and adduct were fine powders. The untreated clay immediately sank down through the water and in less than one minute practically none floated; the bulk was on the bottom and the water was very cloudy. In contrast, the adduct immediately began to sink, but slowly and in lumps. In ten minutes the bulk was on the bottom but largely in lumps, the liquid was much clearer than that containing the untreated clay, and the water surface was still covered by adduct.

*Example 3*

In this example a silica aerogel was reacted with N,N'-dioctadecyl urea.

Silica aerogels are made or formed in a gaseous medium, as by preparing a hydrogel by reaction between sodium silicate and acid in aqueous medium, then either replacing the aqueous medium with water-soluble organic solvents such as an alcohol and heating under pressure, or placing a hydrogel under a pressure greater than the critical pressure of water and then heating, in either case ending up with a highly porous silica from which the former liquid medium has been vaporized. The particular silica aerogel employed in this example had an apparent bulk density of 5.6 pounds per cubic foot, less than 2 percent was larger than 325 mesh size by wet screening, and the surface area was within the range of 100 to 150 square meters per gram. It was a light fluffy white powder.

To 23 grams of the silica aerogel just described was added 3.28 grams (corresponding to the addition of about 14 percent by weight) of N,N'-dioctadecyl urea and the mixture thoroughly stirred. The mixture was then placed in a glass tube and the air therein replaced with nitrogen. The tube was then placed in an electric furnace, while retaining a small hole in the glass tube, and gradually heated to a maximum temperature of 250° C. When that temperature was reached the tube was sealed. The material was maintained at 250° C. for approximately one hour, and the tube then cooled. The resulting adduct is herein called adduct A.

In similar manner, with the except that argon rather than nitrogen was used, 22.4 grams of the silica aerogel was reacted with 4.15 grams of N,N'-dioctadecyl urea. This rate of application of the N,N'-dioctadecyl urea was approximately 1.3 times that used in preparing adduct A. During the heating process some N,N'-dioctadecyl urea and moisture condensed at the coolest end of the tube. This product is herein called adduct B.

Analysis of the adducts gave the following results:

| | Adduct A | Adduct B |
|---|---|---|
| Carbon, weight percent | 4.66 | 5.90 |
| Nitrogen, weight percent | 0.33 | 0.40 |

These products, and the original untreated silica aerogel, were tested for their hydrophobic properties in the manner described in the preceding examples. The untreated silica, when dropped on the surface of a body of water, immediately sank down into and through the water to the bottom of the vessel. Adduct A when similarly placed (in finely divided form) on the surface of water showed a slight tendency towards being hydrophobic but was very soon practically all wet by water. On the other hand, similar testing of the adduct B showed only a small fraction of the product is wet by water when first sprinkled on the surface of a body of water. After three days, only about half of the quantity of adduct B placed on the surface of the water had passed down through the water to the bottom of the beaker.

While the invention has been described herein with particular reference to various preferred embodiments thereof, it will be appreciated that variations from the details given herein can be effected without departing from the invention in its broadest aspects.

I claim:

1. A high surface area hydrophilic inorganic solid possessing ion exchange properties, the surfaces of which have been modified by having firmly bound thereto at least 1 weight percent (based on said solid) of a compound selected from the group consisting of mono-N-substituted carbamyl halides and thiocarbamyl halides and bis(mono-N-substituted) ureas and thioureas.

2. A high surface area hydrophilic inorganic solid possessing ion exchange properties, the surface of which have been modified by having firmly bound thereto at least 1 weight percent (based on said solid) of a mono-N-substituted carbamyl halide.

3. A high surface area hydrophilic inorganic solid possessing ion exchange properties, the surfaces of which have been modified by having firmly bound thereto at least 1 weight percent (based on said solid) of a bis (mono-N-substituted) urea.

4. A high surface area hydrophilic inorganic solid possessing ion exchange properties, the surfaces of which have been modified by having firmly bound thereto at least 1 weight percent (based on said solid) of a bis (mono-N-substituted) thiourea.

5. A high surface area hydrophilic inorganic solid possessing ion exchange properties, the surfaces of which have been modified by having firmly bound thereto at least 1 weight percent (based on said solid) of a mono-N-substituted carbamyl chloride.

6. A clay, the surfaces of which have been modified by having firmly bound thereto at least 1 weight percent (based on said clay) of a mono-N-substituted carbamyl halide.

7. A clay, the surfaces of which have been modified by having firmly bound thereto at least 1 weight percent (based on said clay) of a bis(mono-N-substituted) urea.

8. A high surface area silicate, selected from the group consisting of silicates of di- and trivalent metals, the surfaces of which have been modified by having firmly bound thereto at least 1 weight percent (based on said silicate) of a mono-N-substituted carbamyl chloride.

9. A silica, the surfaces of which have been modified by having firmly bound thereto at least 1 weight percent (based on said silica) of a mono-N-substituted carbamyl halide.

10. A silica, the surfaces of which have been modified by having firmly bound thereto at least 1 weight percent (based on said silica) of a bis(mono-N-substituted) urea.

11. A product according to claim 1 wherein said compound is a mono-N-alkyl carbamyl chloride.

12. A product according to claim 1 wherein said compound is a mono-N-aryl carbamyl chloride.

13. A product according to claim 1 wherein said compound is N-octadecyl carbamyl chloride.

14. A product according to claim 1 wherein said compound is a bis (mono-N-alkyl) urea.

15. A product according to claim 1 wherein said compound is N,N'-dioctadecyl urea.

16. An elastomer, having intimately dispersed therein a product as defined in claim 1.

17. A process which comprises modifying the surfaces of a high surface area hydrophilic inorganic solid possessing ion exchange properties by intimately contacting and heating same with at least 1 weight percent (based on said solid) of a compound selected from the group consisting of mono-N-substituted carbamyl halides and thiocarbamyl halides and bis(mono-N-substituted) ureas and thioureas to firmly bind said compound to said surfaces.

18. A process according to claim 17 wherein said high surface area hydrophilic inorganic solid possessing ion exchange properties is a clay.

19. A process according to claim 17 wherein said high surface area hydrophilic inorganic solid possessing ion exchange properties is a silica.

References Cited in the file of this patent
UNITED STATES PATENTS

| | | |
|---|---|---|
| 2,457,591 | Moore | Dec. 28, 1948 |
| 2,480,814 | Punshon et al. | Aug. 30, 1949 |
| 2,531,396 | Carter et al. | Nov. 28, 1950 |
| 2,622,987 | Ratcliffe | Dec. 23, 1952 |
| 2,625,492 | Young | Jan. 13, 1953 |
| 2,665,264 | Brooks et al. | Jan. 5, 1954 |

OTHER REFERENCES

Grettie et al.: J. Am. Chem. Soc., vol 50, 1928, pp. 668–672.